Feb. 20, 1951 R. C. HEFFERNAN ET AL 2,542,248
COMBINATION PARACHUTE AND CRASH HARNESS
Filed Jan. 30, 1947 4 Sheets-Sheet 1

INVENTORS
Robert C. Heffernan
Fred N. Dickerman
BY
M. B. Tasker
ATTORNEY

Feb. 20, 1951 R. C. HEFFERNAN ET AL 2,542,248
COMBINATION PARACHUTE AND CRASH HARNESS
Filed Jan. 30, 1947 4 Sheets-Sheet 3

INVENTORS
Robert C. Heffernan
Fred N. Dickerman
BY
ATTORNEY

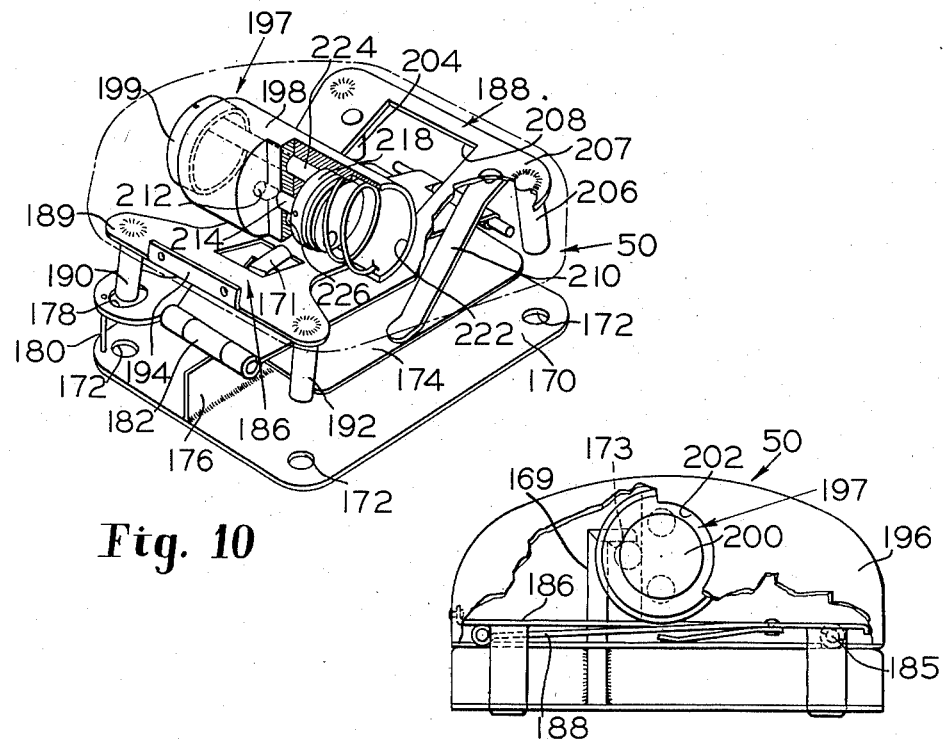
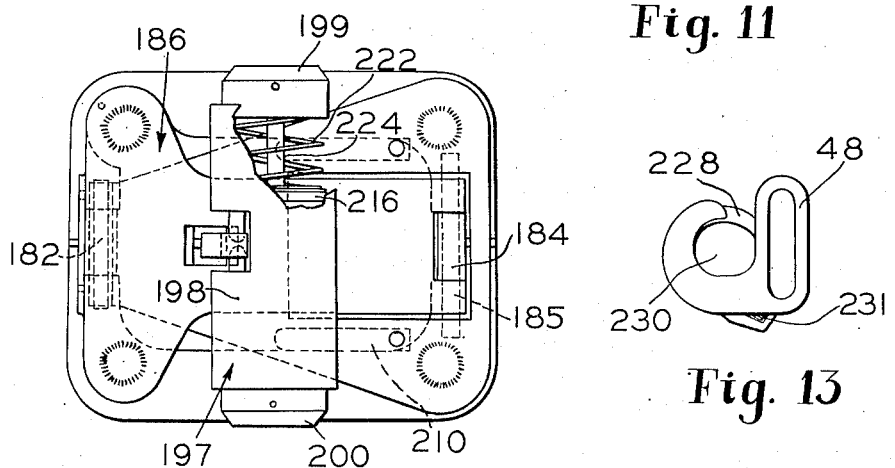

Patented Feb. 20, 1951

2,542,248

UNITED STATES PATENT OFFICE 2,542,248

COMBINATION PARACHUTE AND CRASH HARNESS

Robert C. Heffernan, Garden City, N. Y., and Fred N. Dickerman, Nichols, Conn., assignors to United Aircraft Corporation, East Hartford, Conn., a corporation of Delaware Application January 30, 1947, Serial No. 725,237

6 Claims. (Cl. 244—122)

This invention relates to a combined parachute and crash harness particularly designed for but not limited to the use of fighter pilots.

It is known to provide a harness for the pilot of an aircraft which he wears when he enters or leaves the aircraft and which he attaches to a parachute and other packs stored in the seat during flight.

It is an object of the present invention to provide a parachute pack and harness combination which is normally a part of the aircraft seat equipment and which the pilot attaches to his person only when he takes his place in the seat.

A further object of this invention is the provision of a combined parachute and crash harness which is secured to the pilot's seat by quick release mechanism and to which the pilot attaches himself after he is seated in the aircraft.

Another object of the invention is the provision of improved means for connecting a harness of the above type to the seat either yieldingly or rigidly at the will of the occupant.

Another object of the invention is the provision of improved quick release mechanism for detachably connecting the harness to the seat and releasably securing the harness to the pilot.

These and other objects and advantages of the invention will become apparent from the claims and the following description of the accompanying drawings which illustrate one embodiment of the invention.

In these drawings,

Fig. 10 is a perspective view of the quick-release harness buckle with the cover shown in phantom;

Fig. 11 is an end view of the buckle with part of the cover broken away;

Fig. 12 is a plan view of the buckle with parts broken away; and

Fig. 13 is a detail of a special harness hook which cooperates with the quick-release buckle.

Figure 1:
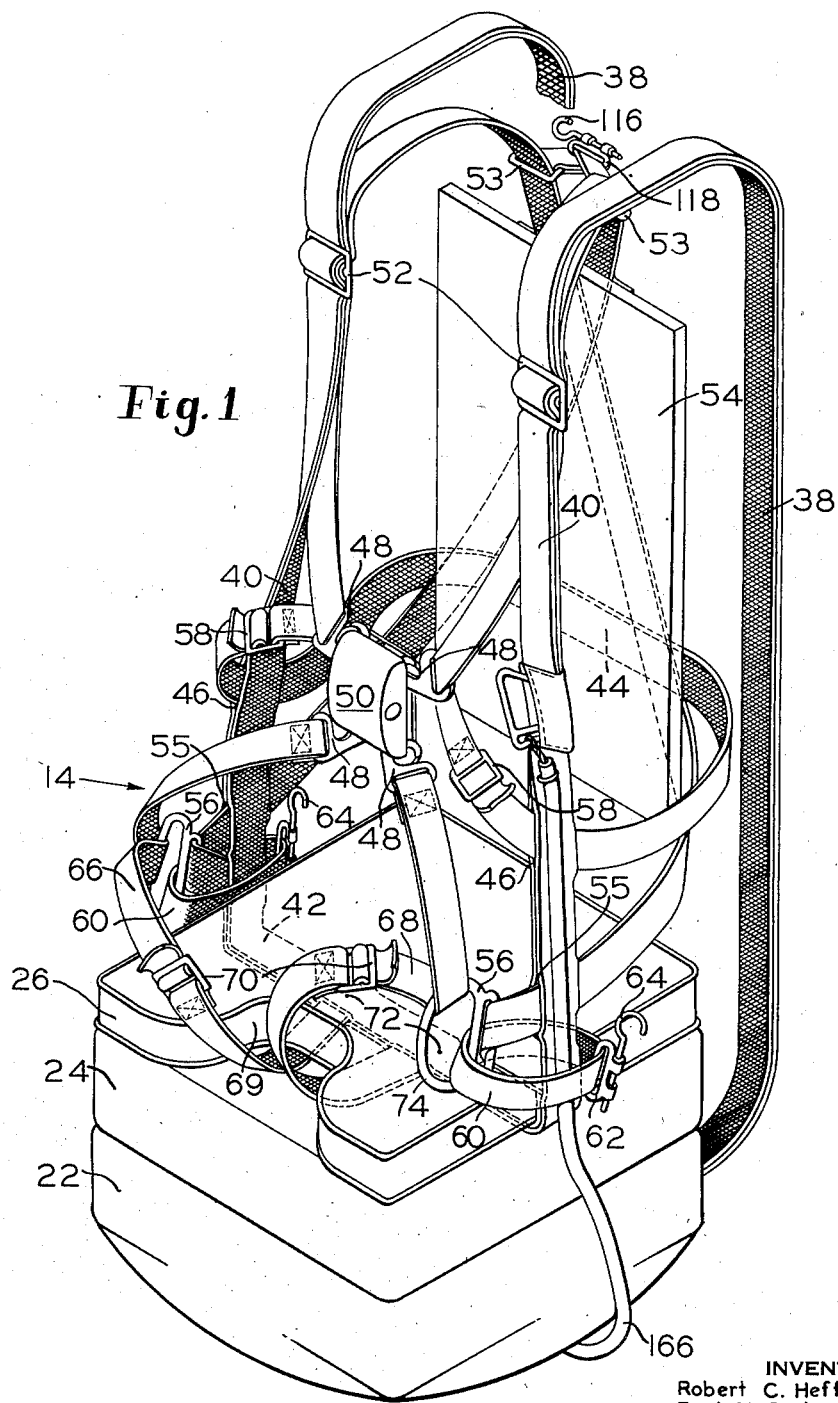
Fig. 1 is a perspective view of the harness and seat packs with the parts of the harness shown in the position they assume when attached to the wearer.
Figure 2:
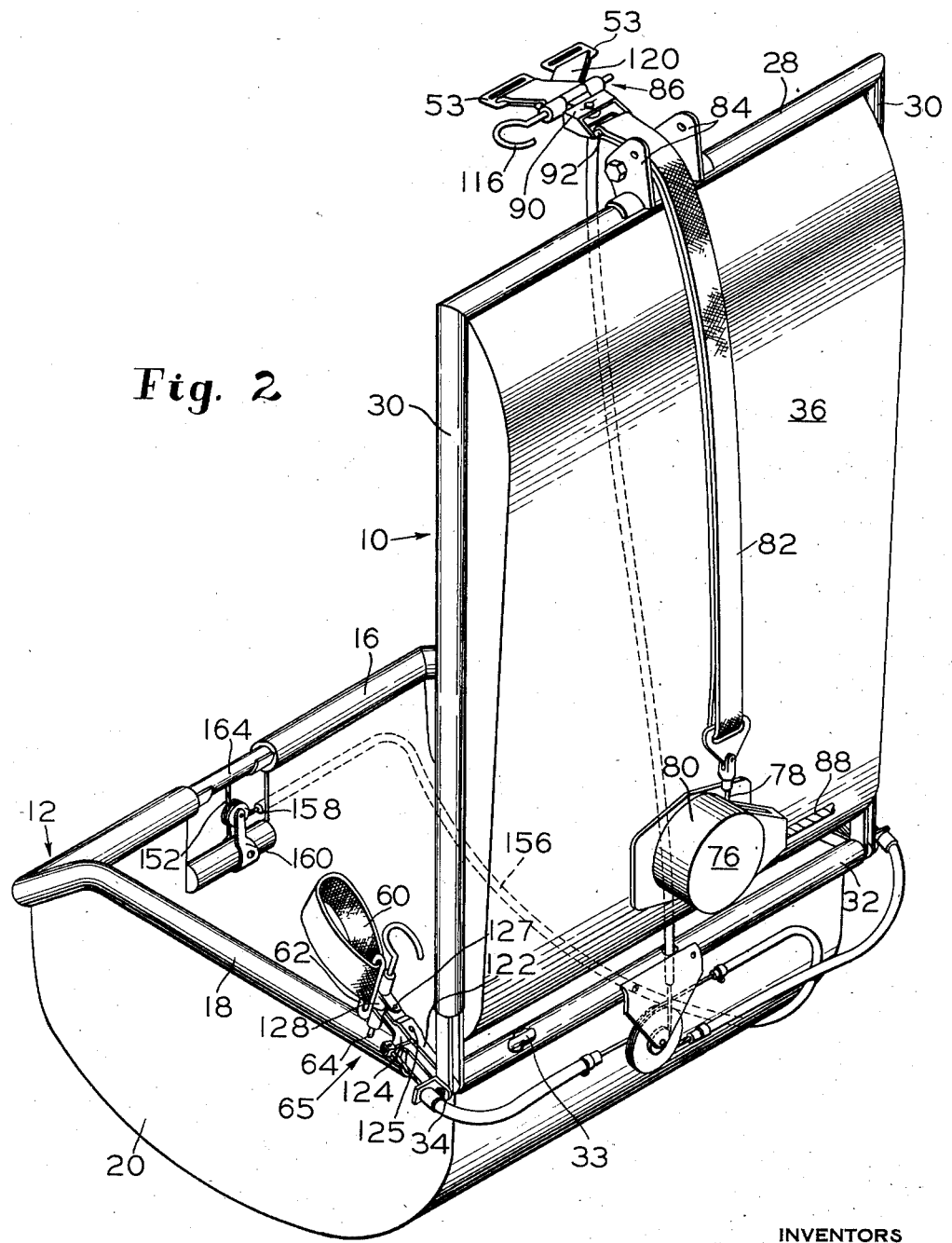
Fig. 2 is a rear perspective view of the seat showing the quick release mechanism for attaching the harness to the seat.

Referring to Figs. 1 and 2, the pilot's seat comprises bucket type back and bottom portions generally indicated at 10 and 12 respectively to which the harness, generally indicated at 14, is normally, although releasably, attached.

The bottom portion of the seat includes a frame having a front rail 16, divided in the middle, and integral side rails 18, and a back rail 32 through which a rod 33 passes, said rod 33 having threaded ends 34 which extend through the ends of side rails 18 and 30 of the seat frames and are pivoted on a seat supporting frame (not shown). The frame is attached to the bucket 20 in which the usual parachute pack 22 and a jungle kit 24 or other pack, are housed beneath a seat cushion 26. The back portion of the seat includes a frame having a top rail 28 and integral side rails 30 which terminate in bifurcated lower ends. The frame for the back portion of the seat carries a bucket 36 which may house a back pack parachute, if one is used, and if desired a back cushion.

The harness 14 includes the usual suspension straps, or risers, 38 the ends of which are attached to the shroud lines of the parachute. When a pilot is suspended from the open parachute, the risers extend downwardly in front of him as indicated at 40 and pass beneath the cushion 26 to provide a seat sling 42. When the parachute is stowed, as illustrated, the risers 38 pass from the sling up over the pilot's shoulders, down his back at each side and beneath the seat packs to the parachute.

In accordance with this invention, the harness 14 not only serves the usual function of a parachute harness but also serves, when the parachute is not in use, as a pilot's shoulder harness and a pilot's safety belt by which the pilot is normally secured to the seat.

The shoulder harness is made of a single ply of strap material the center of which forms a loop 44 which passes around the pilot's back at about waist height from whence it extends forward at each side of the pilot and is threaded through passages 46 formed between plies of the riser portions 40, through hooks 48 which are detachably connected to the upper corners of a quick-release buckle 50, through two-ring adjusting members 52 on risers 38, over the pilot's shoulders, through rings 53 which are detachably connected to the seat back 10, and diagonally across his back where they cross behind the back cushion 54. The shoulder straps then extend forward again at the pilot's sides through passages 55 formed between plies of risers 38, through the smaller ring of a double ring 56 and thence rearwardly again to risers 38 where the two ends are secured between the plies of said risers. Buckles 58 are provided just below hooks 48 by means of which the length of loop 44 can be adjusted. Also the double rings 56 are connected to the seat by loops 60 which pass through said rings, about the risers 38 and through rings 62 which are connected to the seat by quick-release emergency pins 64 and pilot controlled quick-release mechanism 65 hereinafter described.

The pilot's safety belt comprises two single ply loops 66 and 68 having adjusting buckles 70 therein. The lower ends of the loops are connected between the plies of the seat sling at 72 and extend through a central, front cut-away portion 69 of cushion 26 outwardly over the pilot's thighs, through the large rings 74 of double rings 56 and terminate in hooks 48 which are releasably connected to the lower corners of the quick-release buckle 50. It will be noted that the larger rings 74 of double rings 56 are large enough to permit the connector hooks 48 to be readily passed therethrough.

It will be evident that with the two shoulder harness rings 53 connected to the seat back and the safety belt rings 62 connected to the seat at opposite sides thereof, the pilot is supported both at his waist and at his shoulders against forces tending to elevate him or to throw him forward out of the seat.

The connection of rings 53 of the shoulder harness to the seat may be a relatively unyielding one or, at the pilot's discretion, may be yielding. To this end an inertia reel 76 is attached to the seat back (Fig. 2) which contains a spring for maintaining tension on a cable wound around a reel therein (not shown) one end 78 of which extends out of the housing 80 and is attached to a strap 82 which passes upwardly over the seat back rail 28 between two upstanding lugs 84 to the latter of which seat adjusting mechanism (not shown) is adapted to be connected. The strap is connected to rings 53 by pilot controlled quick-release mechanism generally indicated at 86 and shown in detail in Figs. 3 and 4. A cable 88 which is under the control of the pilot operates reel releasing mechanism whereby the pilot, by exerting a pull on cable 88, can release the reel and permit cable 78 to unwind against the action of the spring, while by releasing cable 88 the reel will be automatically locked.

Figure 3:
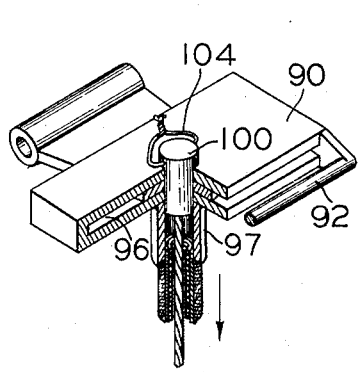
Fig. 3 is an enlarged detail view, partly in section, of the quick release connection between the harness and the seat back.
Figure 4:
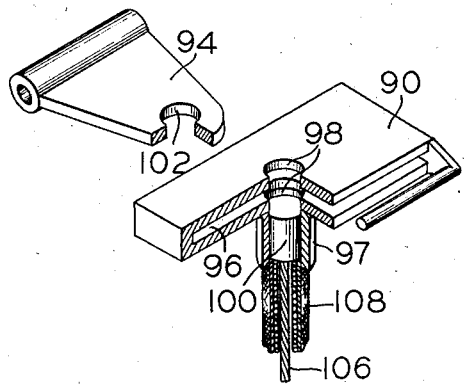
Fig. 4 is a similar view showing the connection released.
Figure 7:
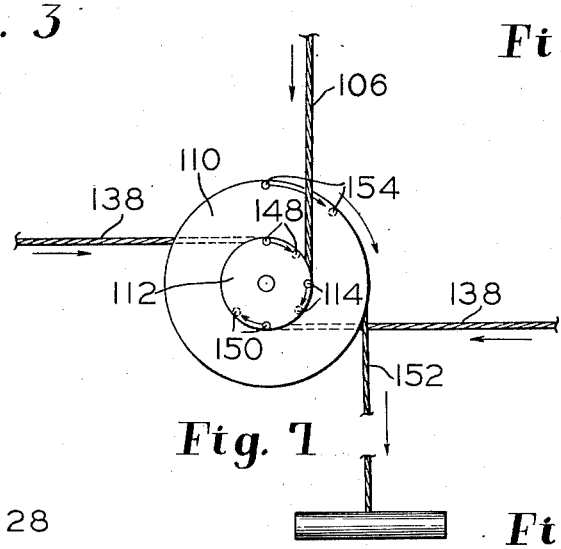
Fig. 7 is a detail view showing the pilot operated mechanism for simultaneously releasing the several connections between the seat and the harness.

The shoulder harness release mechanism shown in Figs. 3 and 4 includes a slotted housing 90 having a ring 92 to which strap 82 is secured and a cooperating tongue 94 which is receivable in the slot 96 in the housing through the open end of the slot. The housing has a cylindrical boss 97 on its bottom face and a cylindrical passage 98 extends through said housing and boss in which a locking plunger 100 is reciprocable. The tongue 94 also has a mating passage 102 through which the plunger extends to lock the tongue to the housing. Whenever tongue 94 is in the housing and the plunger 100 is in the position shown in Fig. 3, the plunger protrudes above the housing 90 and is held in locking position by a safety wire 104 which is threaded through a passage in the protruding end of plunger 100. Wire 104 is soft enough so that a strong pull on cable 106 attached to plunger 100 will shear the wire and permit the plunger to move to the Fig. 4 position thereof wherein the plunger is completely below the tongue 94 and the latter is free to move out of the housing. The cable 106 passes through a sheath 108 which is secured at one end to boss 97 and which terminates at its other end adjacent a two-diameter cable spool 110 (Fig. 7). The end of cable 106 is secured to the periphery of the smaller diameter portion 112 of cable spool 110 at 114 as shown in this figure. The emergency release pin 116 connects a ring 118 with tongue 94 and ring 118 is in turn connected to rings 53 by short straps 120 best shown in Fig. 2. It will be evident that in the event that the quick release 86 fails to operate the pilot can withdraw pin 116 and release the shoulder harness.

Figures 5, 6:
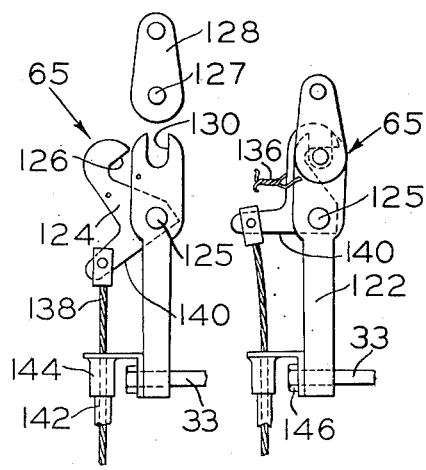
Fig. 5 is a detail view on an enlarged scale, of the lower, left-hand connection between the harness and the seat.
Fig. 6 is a similar view showing the connection released.
Figure 8:
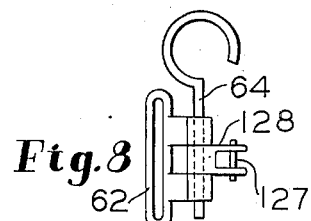
Figs. 8 and 9 are detail views in the connected and disconnected positions respectively of an emergency release.
Figure 9:
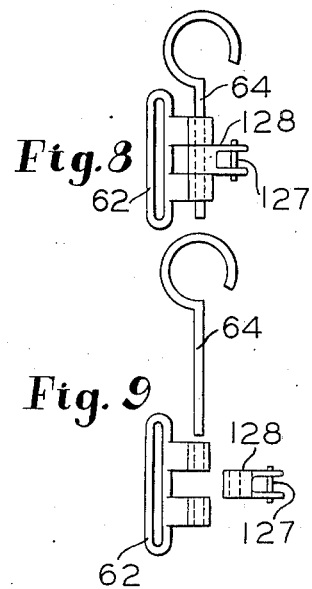

One of the safety belt quick-release connections 65 is shown in Figs. 5 and 6. This includes a U-shaped link 122 the closed end of which is pivotally supported on the threaded end 34 of rod 33 between the furcations of side rail 30 and extends forwardly toward rings 62 of the safety belt previously described. A bellcrank shaped latch 124 pivoted at 125 between the extended arms of link 122 has a latch face 126 which, in the position of the latch in Fig. 5, engages a pin 127 on a two-pronged lug 128 which enters into slots 130 in the end link 122. Lug 128 is connected by emergency release pin 64 with ring 62 as previously described.

The latch 124 is secured in the latching position of Fig. 5 by a safety wire 136 which passes through overlying portions of latch 124 and link 122. A cable 138 is connected to an outstanding arm 140 of latch 124 and passes through a cable sheath 142, the corresponding end of which is fixed to a bracket 144 secured on the threaded end 34 of rod 33 by a nut 146. The two cables 138 from the quick-release connections 65 at the opposite sides of the seat are secured to the upper and lower peripheries of cable spool 112 at 148 and 150 as is best shown in Fig. 7.

It will be evident from Fig. 7 that clockwise rotation of cable spool 110 will cause simultaneous shortening of cables 106 and 138 to effect unlocking of the shoulder harness connection 96 and the two safety belt connections 65. The rotation of spool 110 is accomplished by a cable 152 secured to the periphery of the larger diameter of the spool at 154 and extended through a cable sheath 156 (Fig. 2) which terminates adjacent a pulley 158 journalled in a clip 160 carried by the bucket 20 of the seat bottom directly beneath the cut-away portion 69 in the front edge of seat cushion 26. Cable 152 is attached to a hand grip 164 which rests in a saddle formed in the intermediate cut-away portion of rail 16 at the front of the seat. It will be noted that by having the cable 152 attached to the larger diameter of spool 110 and the cables 106 and 138 secured to the smaller diameter portion 112, sufficient mechanical advantage is obtained to shear the safety wires 104 and 136 and effect release of the entire harness from the seat upon pulling the hand grip 164. Following the release of the harness from the seat the pilot is free to leave the plane and, having cleared the plane, he pulls the rip cord 166 to open his parachute. It is important for the pilot to be able to free himself from the harness quickly, especially if a descent is made over water. To this end the quick-release buckle 50 is provided at a convenient position at the front of the harness.

Referring to Figs. 10, 11, and 12 the base of buckle 50 comprises a welded assembly including a generally rectangular bottom plate 170 having holes 172 at the four corners of the plate and an upper plate 174. These plates are spaced apart by centrally located vertical web plates 176, one of which is shown in Fig. 10. The upper plate is cut away at the corners over three of the holes 172 and is provided with a slightly elongated hole 178 at the fourth corner which is aligned with the hole 172 beneath. A stake 180 is also provided between plates 170 and 174 at the fourth corner for a purpose which will later appear. An upstanding hook 169 is also welded to the top surface of plate 174 the upper hooked end of which has a chamfered upper surface 171 and a flat lower latch surface 173. The welded base assembly also includes hinge butts 182 and 184 at opposite sides thereof to which are pivoted two pin carrying welded assemblies 186 and 188.

The welded assembly 186 comprises a plate 189 which is hinged on the butt 184 by a pin 185 and carries depending harness locking pins 190 and 192 at its free end which, in the lowermost position of plate 189, enter the corresponding holes 172 in base plate 170. Assembly 186 also has an upturned flange 194 to which a cover 196 is secured by rivets, the cover also being pivoted on pin 185 which is long enough to extend beyond the hinge butt for plate 189. Also a release button assembly 197 has its generally cylindrical housing 198 welded to the upper face of plate 189 parallel with the hinge pin 185 and carries release buttons 199 and 200 at its opposite ends which extend slightly through openings 202 at opposite sides of the cover.

The other welded assembly 188 is hinged on the butt 182 and carries depending harness locking pins 204 and 206, similar to pins 190 and 192. Assembly 188 also includes a plate 207 which has a rectangular cut-out 208 through which the narrow hinged end of plate 189 extends. Plate 207 also carries two leaf springs 210 on its lower face which bear against plate 174 of the base assembly and constantly urge plate 207 upwardly to withdraw its pins 204, 206 well out of holes 172 into the position shown in Fig. 10. At the same time the margin of cut-out 208 in plate 207 engages the narrow hinged end of plate 189 and raises this plate to simultaneously withdraw its pins 190 and 192.

The upstanding hook 169 passes through aligned apertures in plates 189 and 207 and, in the depressed position of the cover (Fig. 11), its latch face 173 engages two short, axially aligned and inwardly directed pins 212 and 214 which are carried by retainers 216 and 218 respectively which are mounted for axial sliding movement in recesses in the housing 198 of the release button assembly. The release buttons 199 and 200 are constantly biased outwardly by compression springs 222 which bear against the adjacent retainers 216 and 218. Retainer 216 is fixed to one end of a long pin 224 axially slidably mounted in casing 198 and the other end of pin 224 is fixed to the more remote button 200. Similarly retainer 218 is fixed to one end of slidable pin 226 which carries button 199 at its opposite end. It will be evident that as the buttons 199, 200 are pressed inwardly, the retainers 216, 218 will be oppositely urged outwardly away from each other and that their latch pins 212, 214 will be withdrawn from beneath the latch face 173 of hook 169 to release the plates 189 and 207 carrying the locking pins 190, 192, 204 and 206.

The hook 48 carried by the shoulder straps and by the ends of the leg straps, one of which is illustrated in Fig. 13, are identical in structure and in addition to the ring through which the strap passes are provided with a tongue portion 228 which can close an aperture 230 by action of spring 231. This hook is adapted to be connected loosely on one of the locking pins 190, 192, 204 and 206. It will be evident that when the buckle is in the open position shown in Fig. 10 the hooks will not only be released without opening but will actually be pushed off the locking pins by the plate 174. The hook 48, however, which is attached to the left-hand shoulder strap and engages locking pin 190 is held by stake 180 so that the buckle 50 will not become totally detached from the harness and perhaps lost.

The pilot approaches and enters the aircraft unencumbered by any equipment, since his parachute pack and any other packs he may need are stored in the seat and his harness is already attached to the seat by the quick-release connections 85 at opposite sides of the seat bottom and the quick-release connection 86 at the top of the seat back. As he takes his place in the seat the pilot slips his arms through the shoulder straps as if he were putting on a vest, snaps the cover of buckle 50 to latch the cover closed and snaps hook 48 to pin 192, pin 190 having remained in engagement with the buckle 50 since stake 180 did not allow hook 48 to disengage. He then picks up the two leg straps 66 and 68 which are between his legs, passes the hooks 48 through rings 56 and connects the hooks 48 to pins 204, 206. After a normal landing the pilot can free himself from his harness by merely pressing the two buttons 199 and 200 of buckle 50 simultaneously. This allows the cover of buckle 50 to snap open thus disengaging the pins from all the hooks 48 except the one held by the stake 180. The pilot can now slide out of the harness, leave the harness attached in airplane, and step out of the cockpit.

In the event that he must bail out of the aircraft, all that the pilot need do is pull the bail-out handle 164 which releases the harness from the seat leaving him free to make his exit with his equipment attached to the harness. As he approaches the ground or water, the pilot presses the two buttons 199 and 200 and instantly releases the harness, thus avoiding the danger of becoming entangled.

It will be evident that as a result of this invention an improved parachute and crash harness has been provided which gives full protection to the pilot during flight and in the event of bail out. It will further be evident that the improved harness is simple and reliable in use and eliminates the necessity for a separate safety belt and a separate shoulder harness.

It will further be evident that as a result of this invention the pilot is enabled to enter and leave the aircraft unencumbered by either the harness or equipment usually associated therewith.

While only one embodiment of the invention has been shown and described herein it will be understood that various changes may be made in the construction and arrangement of the parts without departing from the scope of the claims.

What it is desired to secure by Letters Patent is:

1. In combination, an aircraft seat having back and bottom portions, a parachute pack normally stored in said seat, a harness fixedly attached to said pack, a plurality of latch connections fixedly attached to the sides of said bottom seat portion and movably associated with said back seat portion, connecting means between said harness and said latch connections, and means controlled by an occupant while in said seat for simultaneously releasing said latch connections.

2. In combination, an airplane having a pilot's seat, a combined parachute and crash harness including a seat sling having risers, a parachute pack stored in said seat and attached to said risers, shoulder and waist engaging harness members, a plurality of quick-release means fixedly attached to said seat, connecting means for engaging said members to said quick-release means and pilot operated means for simultaneously releasing said connections.

3. In an aircraft, a seat, a parachute pack stored in said seat, a harness fixedly attached to said parachute, means for releasably connecting said harness to encompass the occupant of said seat, means for releasably connecting said seat to said harness at a plurality of points, means controlled by the occupant while in said seat for simultaneously releasing all of said releasable connections between said harness and said seat, and means controlled by said occupant for releasing said harness connections independently of said seat connections, whereby the harness remains attached to said seat as the occupant leaves said aircraft.

4. In an aircraft, a seat having back and bottom portions, a parachute pack stored in said seat, a harness attached to said parachute, means for releasably connecting said harness to encompass the shoulders and thighs of an occupant of said seat, latch means associated with said back and bottom seat portions, means for releasably connecting said harness to said latch means, means for adjusting said connection at the top of said back portion whereby the occupant of the seat is permitted to lean forward through a limited range, means controlled by the occupant of said seat for simultaneously releasing said harness connections from said latch means, and means controlled by said occupant for releasing said harness encompassing connections whereby the harness remains attached to said seat as the occupant leaves said aircraft.

5. A seat device according to claim 4 including a hinged unit having a hinge pin adapted to be grasped by the occupant of the seat in each of said releasable connecting means between said harness and said latch means whereby said releasable connecting means may be individually disconnected by the occupant of the seat independently of said simultaneous latch releasing means.

6. In an aircraft, a seat having back and bottom portions, a parachute pack stored in said seat, a harness attached to said parachute, means for releasably connecting said harness to encompass the shoulders and thighs of an occupant of said seat, releasable connections associated with said back and bottom seat portions, means for releasably connecting said harness to said releasable connections, means for adjusting said connection at the top of said back portion whereby the occupant of the seat is permitted to lean forward through a limited range, means for locking said adjusting means, means controlled by the occupant of said seat for simultaneously releasing said harness connections from said releasable connections, and means controlled by said occupant for releasing said harness encompassing connections whereby the harness remain attached to said seat as the occupant leaves said aircraft.

ROBERT C. HEFFERNAN.
FRED N. DICKERMAN.

REFERENCES CITED

The following references are of record in the file of this patent:

UNITED STATES PATENTS

| Number | Name | Date |
|---|---|---|
| 1,177,927 | Calthrop | Apr. 4, 1916 |
| 1,898,090 | Lethern | Feb. 21, 1933 |
| 1,899,656 | Wigley et al. | Feb. 28, 1933 |
| 2,171,496 | Waite et al. | Aug. 29, 1939 |
| 2,192,109 | Smith | Feb. 27, 1940 |
| 2,195,334 | Lethern | Mar. 26, 1940 |
| 2,275,450 | Manson | Mar. 10, 1942 |
| 2,430,773 | Kowalski | Nov. 11, 1947 |

FOREIGN PATENTS

| Number | Country | Date |
|---|---|---|
| 356,862 | Great Britain | Sept. 17, 1931 |